United States Patent
Krisher

(10) Patent No.: US 6,478,708 B2
(45) Date of Patent: Nov. 12, 2002

(54) ELECTRICALLY CONTROLLABLE BIASING DIFFERENTIAL

(75) Inventor: James A. Krisher, Fort Wayne, IN (US)

(73) Assignee: Spicer Technology Inc., Fort Wayne, IN (US)

( * ) Notice: Subject to any disclaimer, the term of this patent is extended or adjusted under 35 U.S.C. 154(b) by 41 days.

(21) Appl. No.: 09/739,302

(22) Filed: Dec. 19, 2000

(65) Prior Publication Data

US 2002/0077212 A1 Jun. 20, 2002

(51) Int. Cl.[7] .............................................. F16H 48/30
(52) U.S. Cl. ....................................................... 475/150
(58) Field of Search .................................. 475/150, 231

(56) References Cited

U.S. PATENT DOCUMENTS 4,412,459 A * 11/1983 Goscenski, Jr. ............. 475/231
4,679,463 A * 7/1987 Ozaki et al. ................. 475/231
5,279,401 A * 1/1994 Stall ............................. 192/52

* cited by examiner

Primary Examiner—Dirk Wright
(74) Attorney, Agent, or Firm—Liniak, Berenato & White

(57) ABSTRACT

A differential gear assembly has a friction clutch for variably restricting differential action. A simple hydraulic piston mechanism is used to amplify the axial force generated by the electric coil and mechanical ball ramp mechanism. The hydraulic system consists of an annular primary piston in contact with the clutch pack, and a multiple set of secondary pistons are attached to the unrestrained ball ramp race. Hydraulic fluid fills the cavity between the primary and secondary pistons. This system provides force multiplication proportional to the surface areas of the respective piston faces.

10 Claims, 6 Drawing Sheets

ELECTRICALLY CONTROLLABLE BIASING DIFFERENTIAL

BACKGROUND OF THE INVENTION

1. Field of the Invention

The present invention relates in general to a limited slip differential for a vehicle and, in particular, to an electrically controllable biasing differential.

2. Description of the Prior Art

Conventional differential mechanisms consist of a set of bevel gears coupled between two half-shafts of a drive axle. Such a drive axle has the advantages over a solid axle that the wheels of the vehicle can travel at different speeds and equal driving force can be applied to the driving wheels. However, under certain conditions, this conventional differential has a serious deficiency. For example, if one drive wheel is on a slippery surface, such as ice or mud, that wheel will slip and spin because its tire can not grip the road. Consequently, the slipping wheel can apply very little driving torque to move the car. The opposite drive wheel, which well may be on a surface that gives good adhesion, can apply no more driving torque than the spinning wheel because the differential delivers only an equal amount of torque to both wheels. Thus, the total driving force can never be more than twice the amount applied by the wheel with the poorest road adhesion. Traction is also adversely effected, especially during hard driving, by other conditions that unbalance the weight on the driving wheels. When driving at high speed around a curve, the weight is transferred from the inside wheel to the outside wheel. Hard acceleration coming out of a turn can then cause the inside wheel to spin because it has less weight on it and therefore less road adhesion. Similarly, during any hard acceleration there is propeller shaft reaction torque on the rear axle assembly. When one wheel is partially unloaded and looses part of its traction capability, the loss is not offset by gain on the opposite side because the total can only be twice that of the wheel with the lesser capability.

The limited slip differential was designed to improve the traction of a vehicle under adverse traction conditions by allowing the differential to transmit torque to the axle shafts in unequal amounts without interfering with the differential action on turns. The most common limited slip differential is the friction type, which has clutch assemblies mounted between the two side gears and the differential case. In a conventional differential, the side gears and the axle shafts to which they are splined always turn freely in the case. The added clutches provide a means of transferring torque from the faster spinning (usually slipping) wheel to the slower spinning (usually better adhesion) wheel. Typically, there are two clutch packs, each of which is comprised of disks that are splined to the side gear, and plates that are tanged to fit into the differential case. Thus, the disks rotate with the side gear and the plates rotate with the case. The clutches are applied or actuated by two forces. One force is applied by springs compressed between the two side gears, which push the side gears apart, towards the case, and thus keep the plates and disks in contact with each other. This force is relatively constant and preloads the clutches. The other force results from the tendency of the pinions and side gears to push themselves apart as they turn. This force is applied through the side gears and increases the pressure on the plates and disks. This force becomes greater as the driving torque transmitted from the pinions to the side gears increases and is therefore a variable force.

The typical limited slip differential has a design limit on the amount of torque transfer from the faster to the slower wheel, so that the torque on the wheel with good traction is about two and one half times that of the wheel with poor traction. From the above description, several shortcomings of the common limited slip differential are apparent:

(1) During turning maneuvers, torque is transferred to the inside wheel at a rate generally proportional to the driving torque. This results in a tendency to under steer.

(2) Under conditions where one driving wheel is on a very slippery surface while the other has good traction, the amount of torque that can be transferred is very limited, essentially determined by the preload spring force on the clutch packs.

It is the intent of this invention to overcome these shortcomings by providing an externally controllable limited slip differential whose clutch actuating force is not dependent on preload springs or side gear separating forces caused by drive line torque, but rather is provided by hydraulic pressure. The hydraulic pressure is generated by an electrically actuated ball ramp mechanism, which presses on a secondary piston. This pressure may be regulated as necessary to adjust the differential from zero to full locking or full biasing, as driving needs dictate.

SUMMARY OF THE INVENTION

The present invention concerns an electrically controllable biasing differential, which utilizes a multi-disk clutch to selectively bias the differential. The clutch pack is mounted within a differential case half and the clutch disks are alternately splined to a side gear and the case half thereby providing resistance to relative rotation of the left and right output shafts of the differential.

The primary feature of this invention is the unique way of loading the clutch pack to connect one side gear to the differential case. The loading mechanism consists of two separate sub-systems:

An electric coil and mechanical ball ramp mechanism.

A hydraulic piston mechanism.

The electric coil and mechanical ball ramp mechanism provides an axial force by utilizing the rotational displacement of two ball ramp races. When no torque bias is required, both ball ramps are free to rotate with the differential case. When the coil is energized, it provides a rotational resistance to one ball ramp race. The relative rotation between ball ramp races provides axial displacement of the unrestrained ramp race. This displacement could be used to load the differential clutch pack; however, the force generated is not sufficient to provide acceptable performance.

A simple hydraulic piston mechanism is used to amplify the axial force generated by the electric coil and mechanical ball ramp mechanism. The hydraulic system consists of an annular primary piston in contact with the clutch pack, and a multiple set of secondary pistons attached to the unrestrained ball ramp race. Hydraulic fluid fills the cavity between the primary and secondary pistons. This system provides force multiplication proportional to the surface areas of the respective piston faces.

Biasing of the differential is proportional to the torque drag applied across the ball ramp mechanism. As current flow is increased to the coil, the ball ramp races rotate relative to each other, the secondary pistons move axially to pressurize the piston cavity, and the primary piston applies a load to the clutch pack. Decreasing current flow effectively reverses the process.

The frictional drag associated with both mechanisms is relatively low. This minimizes the hysterysis bias variation as current to the coil is increased or decreased.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

The various embodiments of the present invention now will be described in detail with reference to the accompanying drawings.

DESCRIPTION OF THE PREFERRED EMBODIMENTS

Figure 1:
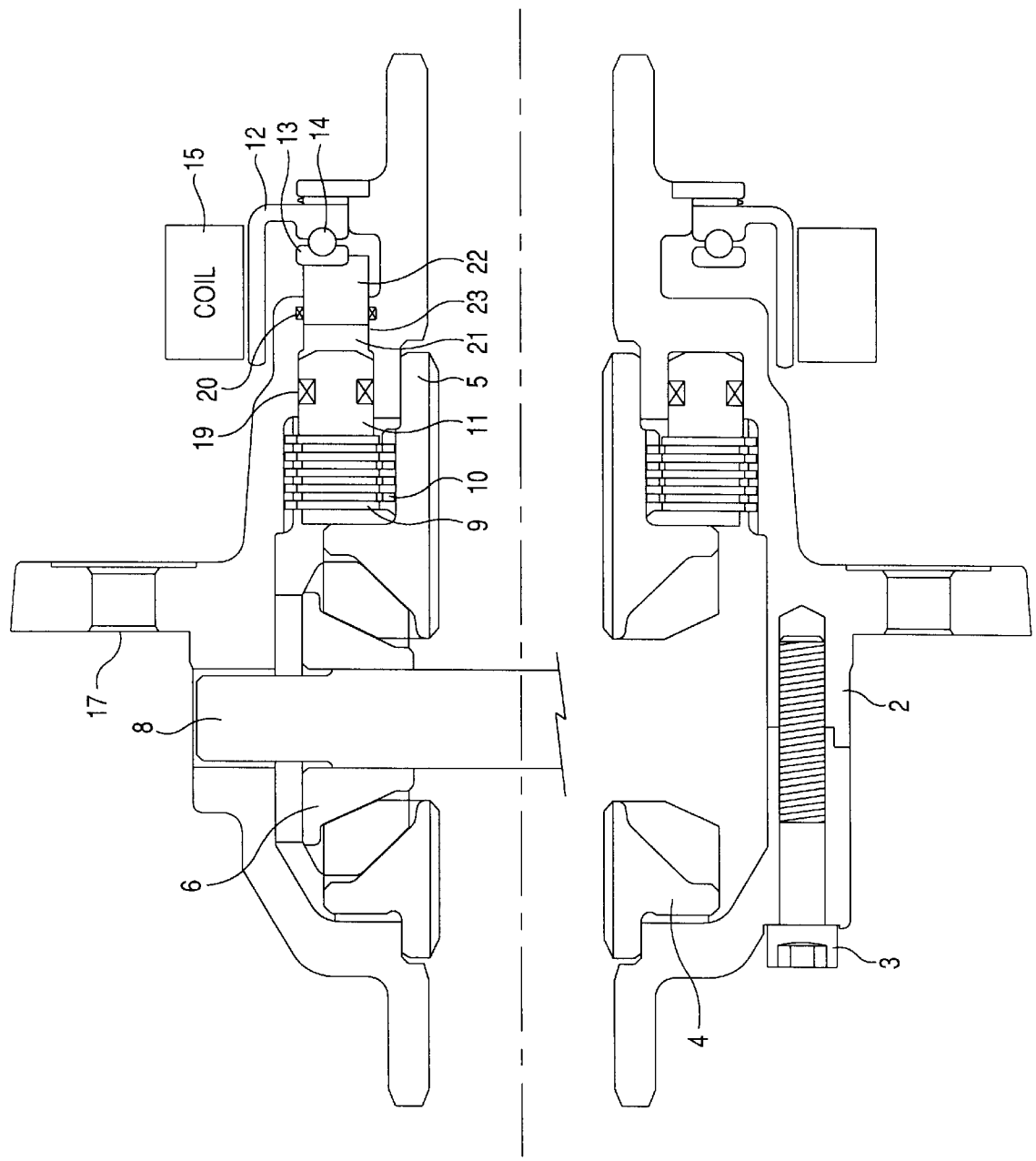
FIG. 1 is a sectional view of a differential assembly incorporating an initial embodiment of the present invention in the unlocked position.
Figure 2:
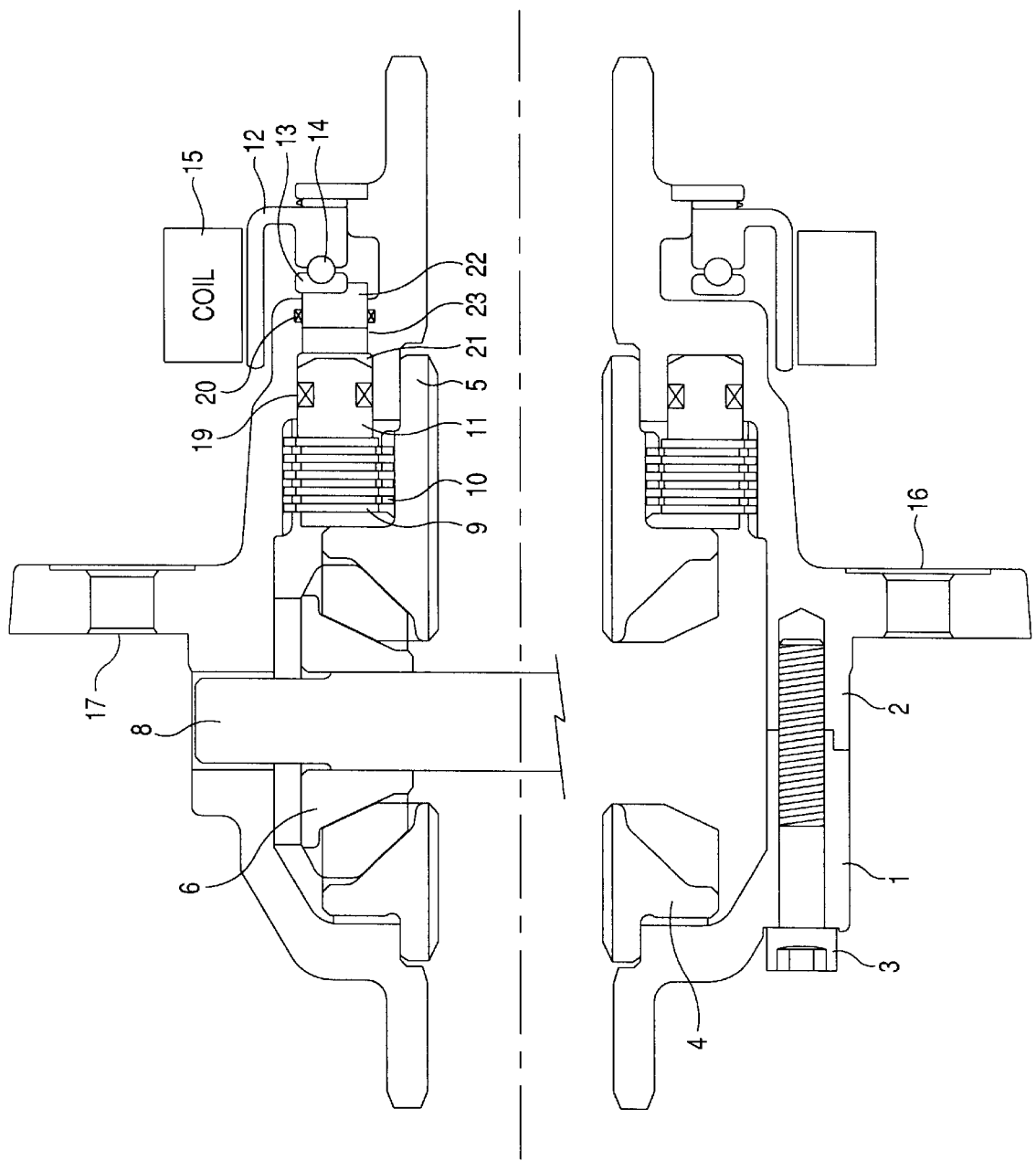
FIG. 2 is a sectional view of a differential assembly of FIG. 1 in the locked position.
Figure 3:
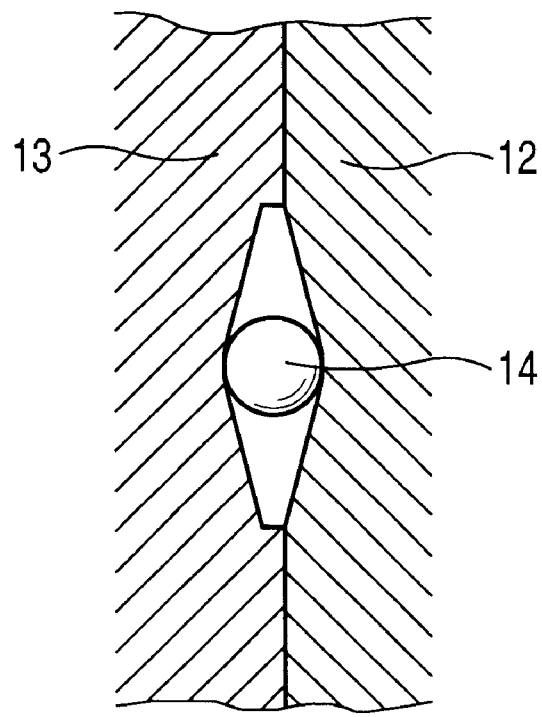
FIG. 3 is a side view of the ball ramp mechanism of the embodiment of FIG. 1.

FIGS. 1–3 represent an initial embodiment of the present invention. With reference initially to FIGS. 1, 2 and 3 differential case half's 1 and 2 are connected together by bolts 3. The assembly of elements 1, 2, and 3 will be hereinafter referred to as the "differential case". At the center of the differential case is a differential gear assembly. The differential gear assembly comprises a pinion shaft 8 with which a pinion gear 6 is engaged rotatably. The pinion gear 6 rotates together with the pinion shaft 8 while rotating around its own axis. On the left and right sides of the pinion gear 6, there are disposed first and second side gears 4 and 5 engaging with the pinion gear 6. The side gears 4 and 5 are connected to left and right axles (not shown). The differential case is provided with a ring gear (not shown) attached by bolts (not shown) which pass though bolt holes 16 and 17. The ring gear engages a hypoid gear (not shown), fitted to a drive shaft (not shown).

Between the differential case and the side gear 5, there is arranged a multiple-disk friction clutch 9, 10, or clutch pack, also referred to as a limited slip device. A first half 9 of a plurality of friction disks of the friction clutch. 9 is fitted to the differential case and movable in an axial direction, in reaction to an axial force and a second half 10 of the friction disks is fitted to the side gear 5 and is also movable in the axial direction in reaction to an axial force. The friction disks 9 and 10 are alternately arranged one after another.

The primary feature of the invention is the unique structure used to load the clutch pack to connect one side gear to the differential case. The loading mechanism consists of two separate sub-systems:

An electric coil and mechanical ball ramp mechanism.

A hydraulic piston mechanism.

The electric coil and mechanical ball ramp mechanism provides an axial force by utilizing the rotational displacement of two ball ramp races. When no torque bias is required and both ball ramps are free to rotate with the differential case. When the coil is energized, it provides a rotational resistance to one ball ramp race. The relative rotation between ball ramp races provides axial displacement of the unrestrained ramp race. More specifically, the biasing of the differential is proportional to the torque drag applied across ball ramp mechanism 12, 13, 14. When there is no current flowing though coil 15 ball ramp race 12 and unrestrained ball ramp race 13 rotate in unison and no biasing occurs. As current begins to flow to the coil 15, ball ramp race 12 begins to slow in relative rotation to unrestrained ball ramp race 13. The relative rotation between ball ramp race 12 and unrestrained ball ramp race 13 causes balls 14 to travel up the ball ramp 23, forcing the ball ramp races 12, 13 apart.

This displacement could be used to load the differential clutch pack; however, the force generated is not sufficient to provide acceptable performance.

A simple hydraulic piston mechanism or hydraulic amplifier is used to amplify the axial force generated by the electric coil and mechanical ball ramp mechanism. The hydraulic system consists of an annular primary piston in contact with the clutch pack, and multiple secondary pistons, which are attached to the unrestrained ball ramp race. Hydraulic fluid fills the cavity between the primary and secondary pistons. Specifically, there is an annular primary piston 11, fitted in a primary cylinder 7, in contact with the clutch pack 9, 10. Hydraulic fluid fills a cavity 21 between primary piston 11, and secondary pistons 22, fitted in secondary cylinders 23. Seals 19 and 20 retain the hydraulic fluid. The secondary pistons 22 are attached to the unrestrained ball ramp race 13. Due to the secondary pistons combined surface area being different than the primary piston's surface area, the system provides force multiplication, which is proportional to the surface areas of the respective piston faces.

The moving apart of the ball ramp races 12, 13 is what actuates secondary pistons 22, increasing the pressure in cavity 21 which actuates primary piston 11. Primary piston 11 presses on clutch disks 9 which then frictionally engage clutch disks 10, causing side gear 5 to rotate at a speed more close to the speed of the differential case, increasing the biasing, as seen in FIG. 2. Decreasing current flow to coil 15 effectively reverses the process.

Figure 4:
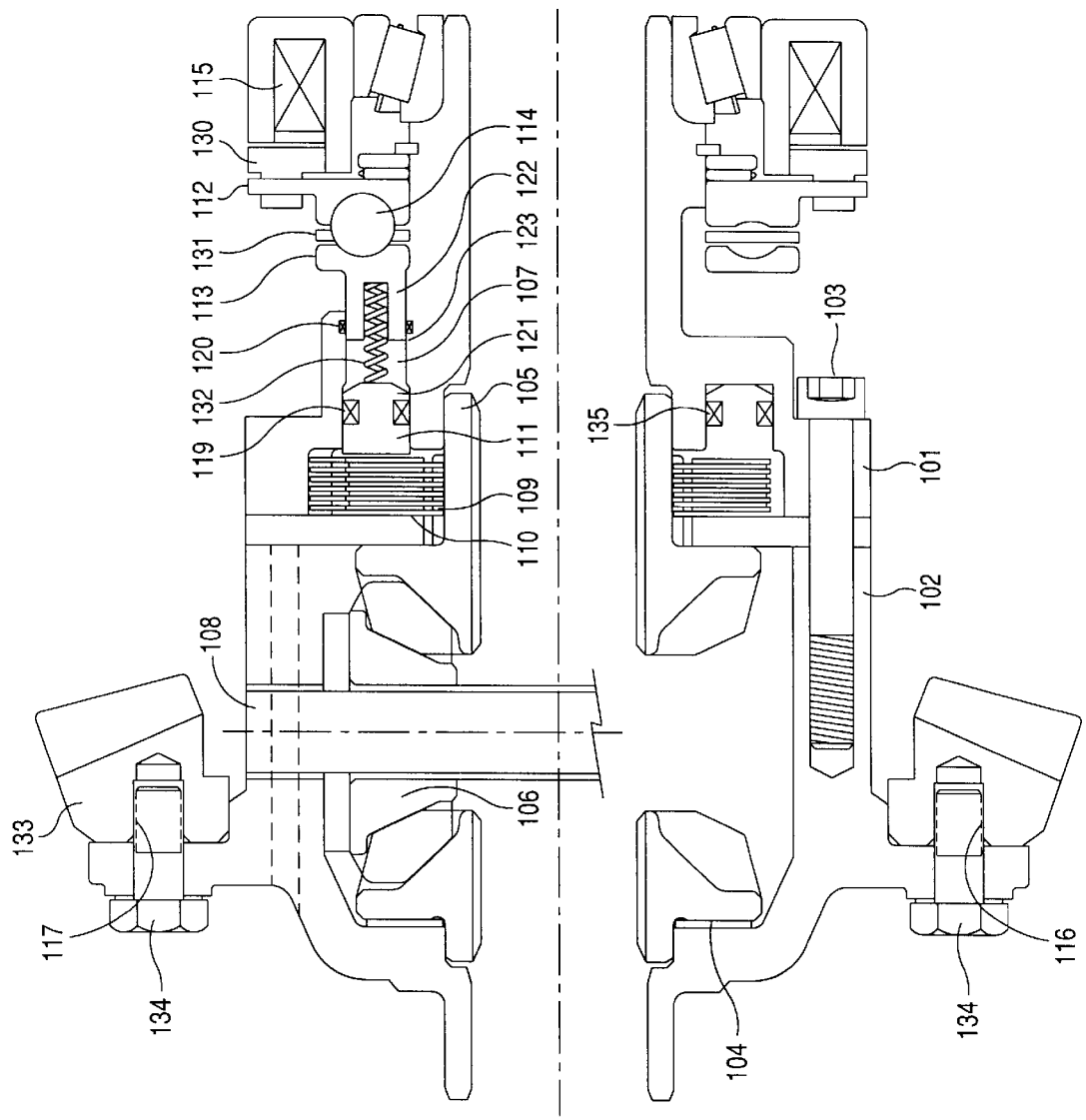
FIG. 4 is a sectional view of a differential assembly incorporating the preferred embodiment of the present invention in the unlocked position.
Figure 5:
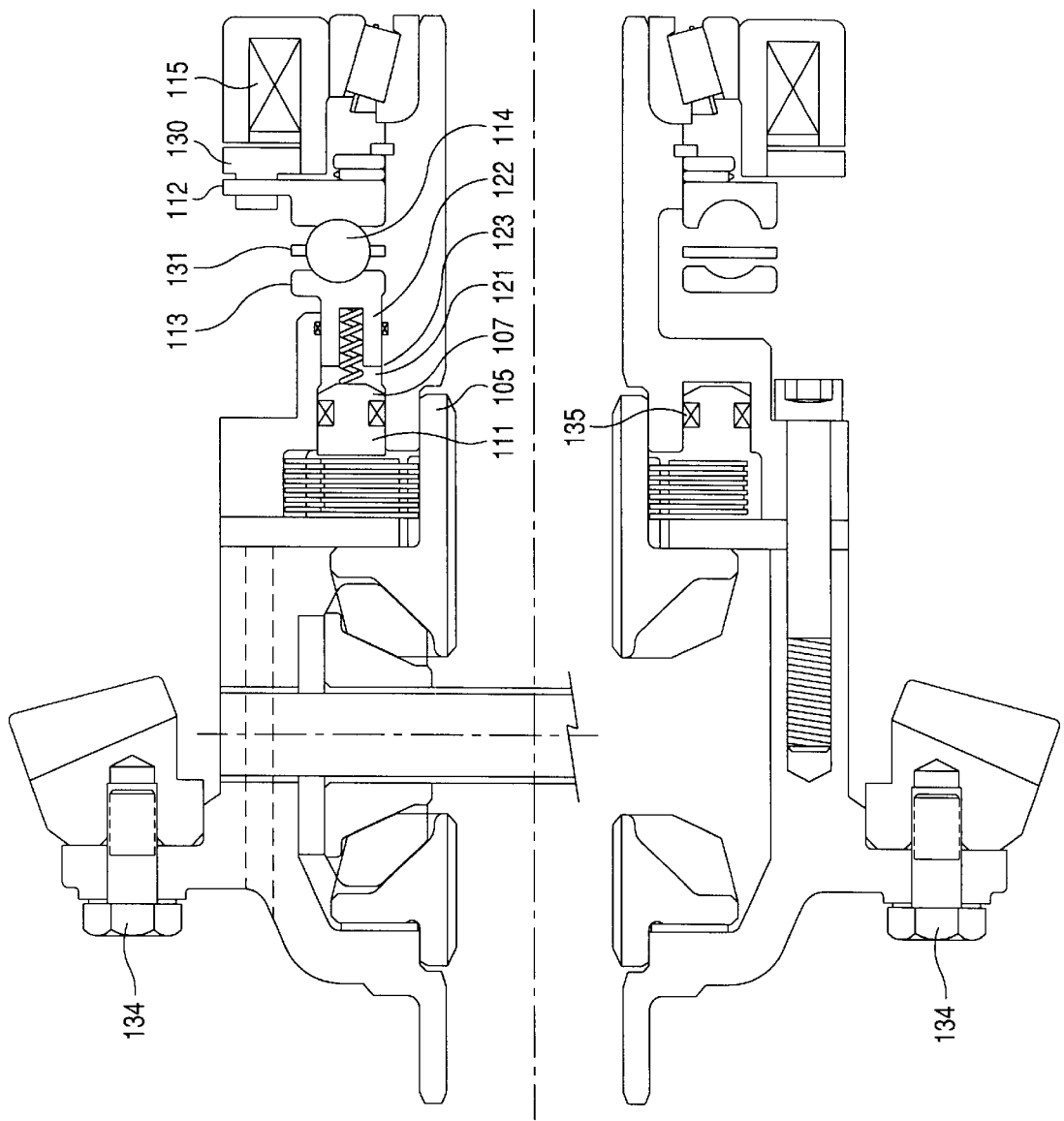
FIG. 5 is a sectional view of a differential assembly incorporating the preferred embodiment of the present invention in the locked position.
Figure 6:
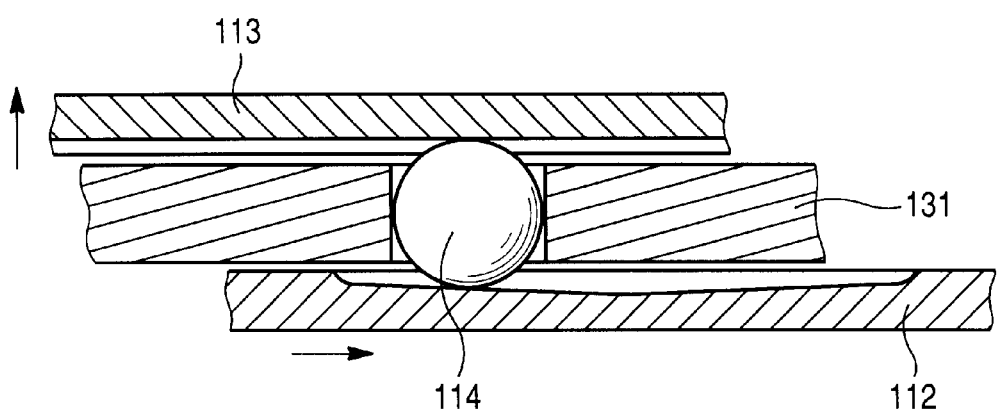
FIG. 6 is a side view of the ball ramp mechanism of the preferred embodiment of the present invention.

While the previous embodiment represents an initial design, the preferred embodiment is depicted in FIGS. 4–6. With reference to FIGS. 4, 5 and 6, differential case half's 101 and 102 are connected together by bolts 103. The assembly of elements 101, 102, and 103 will be hereinafter referred to as the "differential case". At the center of the differential case is a differential gear assembly. The differential gear assembly comprises a pinion shaft 108 with which a pinion gear 106 is engaged rotatably. The pinion gear 106 rotates together with the pinion shaft 108 while rotating around its own axis. On the left and right sides of the pinion gear 106, there are disposed first and second side gears 104 and 105 engaging with the pinion gear 106. The side gears 104 and 105 are connected to left and right axles (not shown). The differential case is provided with a ring gear 133 attached by bolts (134) which pass though bolt holes 116 and 117. The ring gear engages a hypoid gear (not shown), fitted to a drive shaft (not shown).

Between the differential case and the side gear 105, there is arranged a multiple-disk friction clutch 109, 110, or clutch pack, also referred to as a limited slip device. A first half 109 of a plurality of friction disks of the friction clutch, is fitted to the differential case and movable in an axial direction, in reaction to an axial force and a second half 110 of the friction disks is fitted to the side gear 105 and is also movable in the axial direction in reaction to an axial force. The friction disks 109 and 110 are alternately arranged one after another.

As in the first embodiment, the primary feature of the invention is the unique structure used to load the clutch pack to connect one side gear to the differential case. The loading mechanism consists of two separate sub-systems:

An electric coil and mechanical ball ramp mechanism.

A hydraulic piston mechanism.

The electric coil and mechanical ball ramp mechanism provides an axial force by utilizing the rotational displacement of two ball ramp races. When no torque bias is required and both ball ramps are free to rotate with the differential case. When the coil is energized, it provides a rotational resistance to one ball ramp race. The relative rotation between ball ramp races provides axial displacement of the unrestrained ramp race. More specifically, the biasing of the differential is proportional to the torque drag applied across ball ramp mechanism 112, 113, 114, 131. When there is no current flowing though coil 115, race retarding plate 130, which is connected to ball ramp race 112, and unrestrained ball ramp race 113 rotate in unison and no biasing occurs. As current begins to flow to the coil 115, race retarding plate 130, which is connected to ball ramp race 112, begins to slow in relative rotation to unrestrained ball ramp race 113. The relative rotation between ball ramp race 112 and unrestrained ball ramp race 113 causes balls 114, which are held in ball retainer 131, to travel up the ball ramp 123, forcing the ball ramp races 112, 113 apart.

This displacement could be used to load the differential clutch pack; however, the force generated is not sufficient to provide acceptable performance.

A simple hydraulic piston mechanism or hydraulic amplifier is used to amplify the axial force generated by the electric coil and mechanical ball ramp mechanism. The hydraulic system consists of an annular primary piston in contact with the clutch pack, and multiple secondary pistons, which are attached to the unrestrained ball ramp race. Hydraulic fluid fills the cavity between the primary and secondary pistons. Specifically, there is an annular primary piston 111, fitted in a primary cylinder 107, in contact with the clutch pack 109, 110. Hydraulic fluid fills a cavity 121 between primary piston 111 and secondary pistons 122, fitted in secondary cylinders 123. Seals 119, 135 and 120 retain the hydraulic fluid. Primary piston 111 and secondary pistons 122 are held at a relatively constant distance from each other by spring 132. The secondary pistons 122 are attached to the unrestrained ball ramp race 113. Due to the secondary pistons combined surface area being different than the primary piston's surface area, the system provides force multiplication, which is proportional to the surface areas of the respective piston faces.

The moving apart of the ball ramp races 112, 113 is what actuates secondary pistons 122, increasing the pressure in cavity 121, which actuates primary piston 111. Primary piston 111 presses on clutch disks 109 which then frictionally engage clutch disks 110, causing side gear 105 to rotate at a speed more close to the speed of the differential case, increasing the biasing, as shown in FIG. 4. As can be seen in FIG. 5, activation of the coil 115, causes relative rotation between the ball ramp 112 and 113. Consequently the ball rides up on a bolstered or thick portion of the ball ramp 112 forcing the ball ramp 113 and piston 121 to the left as compared to the unlocked position depicted in FIG. 4. Decreasing current flow to coil 115 effectively reverses the process.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An axle assembly comprising:
   a differential case;
   a gear assembly rotatably disposed within said differential case to provide torque transfer to a pair of output shafts, said gear assembly including a pair of side gears and mounted rotatably about an axis of rotation of said differential case and each side gear fixed to one of said output shafts;
   at least one limited slip device disposed between one of said gears and said differential case provided to retard relative rotation there between;
   an electrically controllable actuating mechanism disposed between said at least one limited slip device and said differential case to selectively actuate said limited slip device; and,
   hydraulic amplifier mechanism engaging said electrically controllable actuating mechanism and provided to amplify an actuating force generated by said actuating mechanism acting on said limited slip device, wherein said hydraulic amplifier is arranged in series between said at least one limited slip device and the electrically controllable actuating mechanism to amplify an axial force generated by said electrically controllable mechanism.

2. An axle assembly as claimed in claim 1 wherein said limited slip device is a clutch pack; said clutch pack including; a first half of a plurality of friction disks of said clutch pack fitted to the differential case and movable in an axial direction, and a second half of said friction disks of said clutch pack fitted to one of said side gears and is also movable in the axial direction, said friction disks alternately arranged one after another.

3. An axle assembly as claimed in claim 2 wherein said electrically controllable actuating mechanism is an electrically activated ball ramp mechanism.

4. An axle assembly as claimed in claim 3,wherein said ball ramp mechanism includes a unrestrained ball ramp race, a ball ramp race and at least one ball.

5. An axle assembly as claimed in claim 4 wherein said unrestrained ball ramp race, said ball ramp race and at least one ball all rotate in unison when no biasing occurs.

6. An axle assembly as claimed in claim 5 wherein the electrically activated ball ramp mechanism includes a coil; wherein
   as current begins to flow to said coil, the ball ramp race begins to slow in relative rotation to the unrestrained ball ramp race;
   relative rotation between ball ramp race and unrestrained ball ramp race causes at least one ball to travel up the ball ramp forcing the ball ramp race and the unrestrained ball ramp race apart.

7. An axle assembly as claimed in claim 2, wherein said hydraulic amplifier comprises:
   an annular primary piston in contact with said clutch pack;
   secondary pistons in contact with an unrestrained ball ramp race;
   a cavity between said primary piston and secondary pistons, filled with hydraulic fluid; wherein
   said secondary pistons combined surface area being different than said primary piston surface area, providing force multiplication, which is proportional to said surface areas of said respective piston faces.

8. An axle assembly for driving a pair of vehicle half axles from a drive shaft, comprising:

a differential gear assembly in a differential case; the case is adapted to be coupled between a vehicle drive shaft and a pair of vehicle half axles;

the differential gear assembly comprises first and second side gears and a pinion gear meshing with the side gears, the pinion gear is fitted rotatably the case, the side gears are fixed to the half axles;

a clutch pack for restricting the differential action of said assembly; wherein a first half of a plurality of friction disks of the clutch pack is fitted to the differential case and movable in an axial direction, and a second half of the friction disks of the clutch pack is fitted to a first side gear and is also movable in the axial direction, the friction disks alternately arranged one after another;

an actuating mechanism disposed between said clutch pack and said differential case to selectively actuate said clutch pack; and, an amplifying mechanism engaging said actuating mechanism and provided to amplify an actuating force generated by said actuating mechanism acting on clutch pack, wherein said amplifying mechanism further includes;

an annular primary piston in contact with the clutch pack;

secondary pistons in contact with an unrestrained ball ramp race; and a cavity between the primary piston and secondary pistons, filled with hydraulic fluid; the secondary pistons combined surface area being different than the primary piston surface area, providing force multiplication, which is proportional to the surface areas of the respective piston faces.

9. An axle assembly as claimed in claim 8, therein said actuating mechanism further comprises a ball ramp mechanism, comprising a ball ramp race, an unrestrained ball ramp race and at least one ball;

a coil, which, when a current flows through the coil, slows the rotation of the ball ramp race.

10. A variable lock vehicle differential apparatus for driving a pair of vehicle half axles from a drive shaft, comprising:

a differential gear assembly in a differential case; the case is adapted to be coupled between a vehicle drive shaft and a pair of vehicle half axles;

the differential gear assembly comprises first and second side gears and a pinion gear meshing with the side gears, the pinion gear is fitted rotatably to a pinion shaft which is inserted into the case, the side gears are fixed to the half axles;

a clutch pack for restricting the differential action of said assembly; wherein a first half of a plurality of friction disks of the clutch pack is fitted to the differential case and movable in a thrust direction, and a second half of the friction disks of the clutch pack is fitted to a first side gear and is also movable in the thrust direction, said friction disks alternately arranged one after another; an annular primary piston in contact with the clutch pack;

secondary pistons in contact with an unrestrained ball ramp race;

a cavity between the primary piston and secondary pistons, filled with hydraulic fluid;

the secondary pistons combined surface area being different than the primary piston surface area, providing force multiplication, which is proportional to the surface areas of the respective piston faces:

a ball ramp mechanism, comprising a ball ramp race, an unrestrained ball ramp race and at least one ball;

a coil, which, when a current flows through the coil, slows the rotation of the ball ramp race;

whereby, when slowing of the ball ramp race occurs, the ball ramp race and the unrestrained ball ramp race move apart;

whereby, the moving apart of the ball ramp races moves the secondary pistons into the cavity, increasing the pressure in the cavity causing the primary piston to press on the clutch pack, engaging the clutch pack.

* * * * *